United States Patent [19]
Moziek

[11] 3,733,153
[45] May 15, 1973

[54] APPARATUS FOR MINIMIZING STRAND DROP-OFF

[75] Inventor: John Moziek, South Hadley, Mass.

[73] Assignee: Monsanto Company, Saint Louis, Mo.

[22] Filed: May 14, 1971

[21] Appl. No.: 143,574

[52] U.S. Cl. ............................425/71, 65/2, 65/116, 264/178 F
[51] Int. Cl. ..........................B29c 25/00, B29d 7/20
[58] Field of Search............................18/8 F, 12 TT; 264/178 F, 176 F; 65/2, 11, 116; 57/152; 425/67, 71

[56] References Cited

UNITED STATES PATENTS

| | | | |
|---|---|---|---|
| 3,464,197 | 9/1969 | Martin | 57/152 |
| 2,452,884 | 11/1948 | Werner | 264/178 F |
| 2,787,021 | 4/1957 | Schmitz | 18/8 F |
| 2,887,725 | 5/1959 | Vickers et al. | 18/12 TT UX |
| 2,952,038 | 9/1960 | Goins et al. | 264/178 F X |

Primary Examiner—J. Spencer Overholser
Assistant Examiner—Michael O. Sutton
Attorney—John W. Klooster, James C. Logomasini, Donald W. Peterson, Neal E. Willis

[57] ABSTRACT

A system for controlling strand drop off at an extrusion die in a plastic stranding operation is provided. A plurality of hot polymer strands generally uniformly spaced from one another in a horizontal direction from the extrusion die pass downwardly into a cooling bath beneath a hold down bar assembly. The continuously moving strands slidably engage circumferential surface portions of a cylindrical member positioned in the surface of the cooling bath which is revolvably driven by the strands passing thereover. When a strand breaks, it almost immediately contacts an adjacent strand and is immediately bonded thereto, all strands still being in a thermoplastic condition, so that all strands continue to move forward down into the cooling bath without loss of the broken strand.

4 Claims, 6 Drawing Figures

INVENTOR
John Moziek

BY
John W. Klooster
ATTORNEY

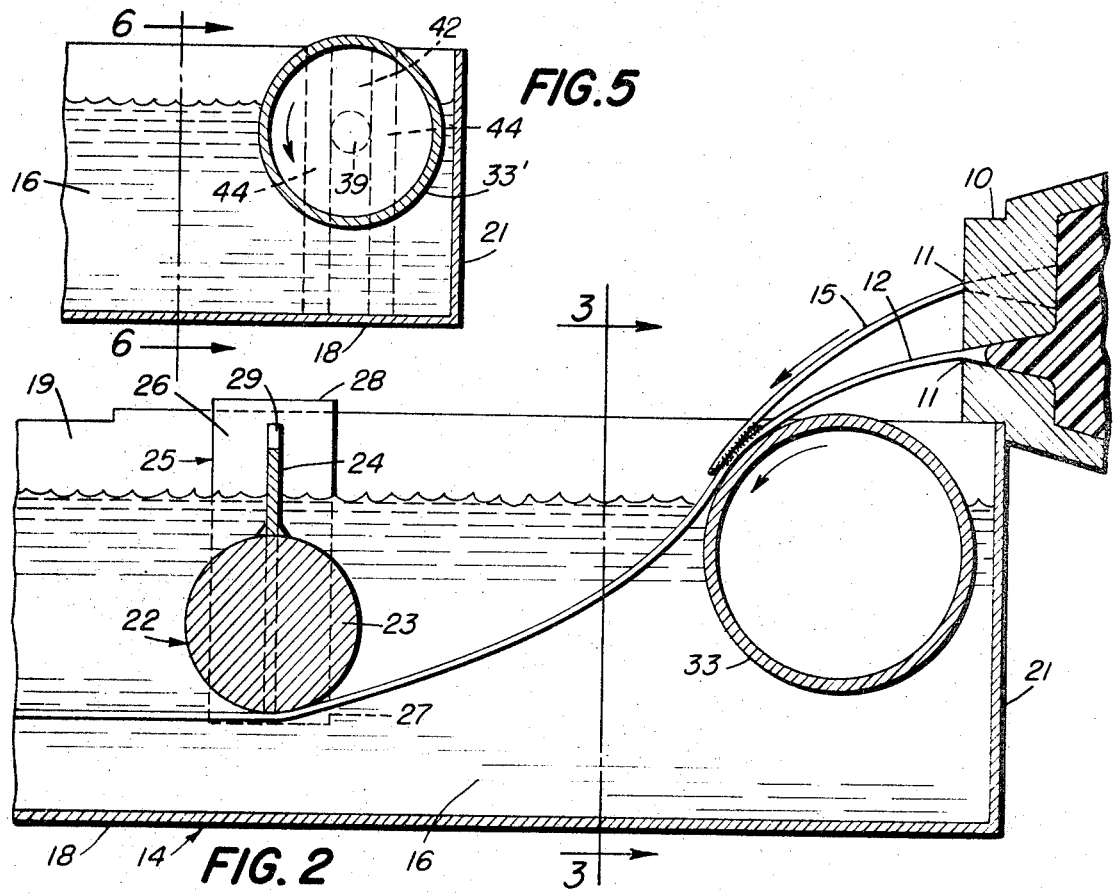
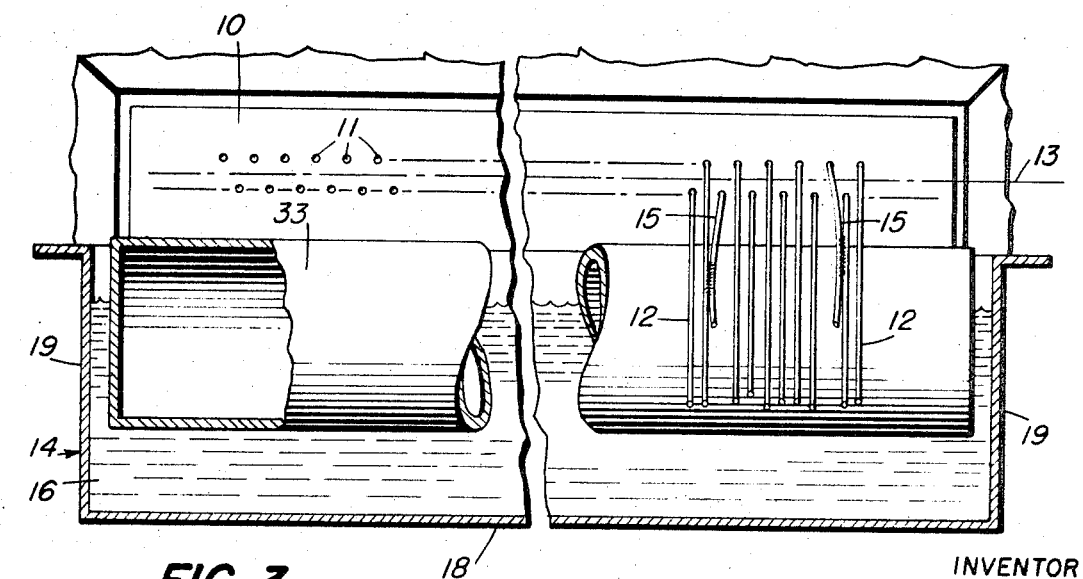

PATENTED MAY 15 1973 3,733,153
SHEET 3 OF 3
FIG. 4
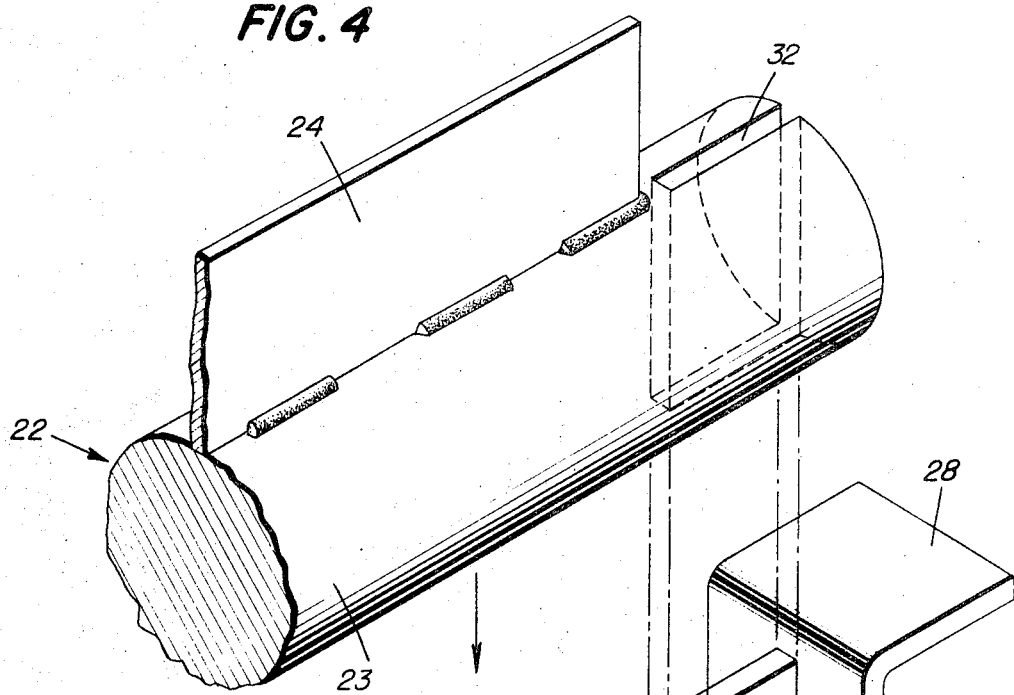
FIG. 6
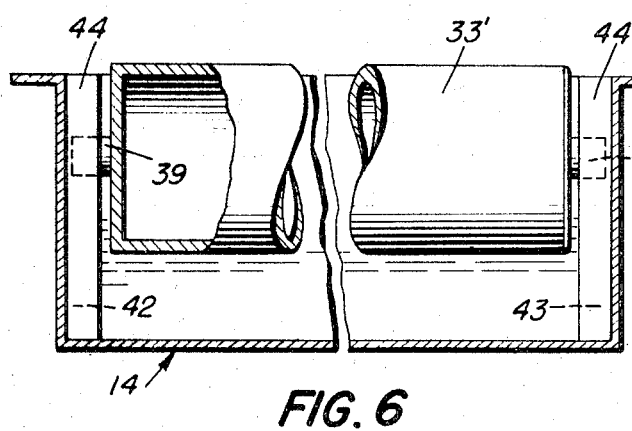
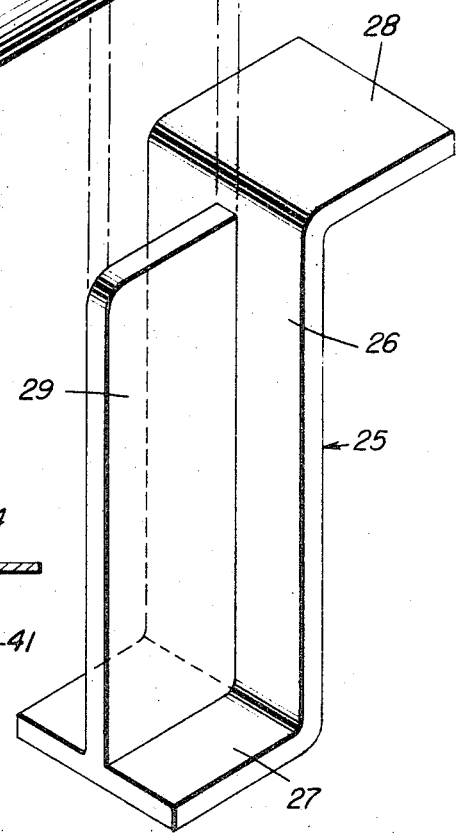
INVENTOR
John Moziek
BY
John W. Klooster
ATTORNEY

APPARATUS FOR MINIMIZING STRAND DROP-OFF

BACKGROUND

In the manufacture of thermoplastic extrudable and moldable materials, it is normal and conventional to strand the plastic, to cool it, and thereafter cut it up into small pieces called pellets or the like. Many common plastics are processed in this way including polystyrene, acrylates, styrene/acrylonitrile, acrylonitrile/butadiene/styrene graft copolymer, polyvinyl chloride, etc.

During extrusion in a stranding operation, air or water is inevitably present in small amounts in the polymer melt fed to the extruder die. Consequently, as soon as a hot strand emerges from the die, any air or water vapor pocket in the extruded strand expands at a rapid rate, even explosively, and the continuity of the hot strand is interrupted, thereby breaking the strand. Typically, strand rupture occurs rather frequently in a normal standing operation but in a random and unpredictable manner.

As soon as a strand breaks, a loose end is created which must be tied to the remaining strands immediately or a so-called bird's nest is created which promptly jams the cutting equipment at the end of the cooling bath preventing further continuous operation of the stranding equipment.

Heretofore, a number of solutions and mechanical contrivances have been proposed for use in controlling strand drop off at an extrusion die, but so far as I have been able to determine, all suffer from one form of deficiency or another. I have now discovered a simple and exceedingly effective system for controlling strand drop off at an extrusion die in a stranding operation which enables one to substantially immediately fuse a broken strand to adjacent strands without interrupting an extruding operation. The system can be used with conventional stranding dies and equipment and involves usually only a modest modification of conventional stranding equipment.

SUMMARY

The present invention is directed to apparatus for control of strand drop off at an extrusion die in a plastic stranding operation. The apparatus employs an elongated extrusion die means which has defined therein a plurality of orifices adapted for the extrusion of hot polymer strands therethrough in generally parallel configuration. These orifices are generally regularly spaced from one another, and, further, are regularly positioned in an elongated pattern whose center line is approximately horizontal.

A fluid cooling bath is employed; the bath including the cooling fluid as well as the fluid holding means. The die means has its center line positioned generally above the surface of the cooling fluid, and the die means is positioned usually transversely across the fluid cooling bath so as to be generally parallel with the surface of the cooling fluid.

A deflecting assembly is employed. The assembly includes bar means and baffle means. The bar means horizontally extends in a direction generally parallel to the center line of the die means. The bottom edge portion of the bar means is immersed in the cooling fluid bath below the surface of the cooling fluid. The baffle means in the deflecting assembly usually is positioned generally over, and is interconnected with, the bar means, and it protrudes somewhat above the surface of the cooling fluid in a direction generally parallel to the center line of the die means.

A pick-up roll assembly is used which includes a cylinder and roll positioning means. The cylinder is axially revolvable in the surface of the cooling fluid in the fluid cooling bath. The cylinder itself is preferably adapted to float freely in the fluid. The axis of the cylinder extends horizontally in a direction generally parallel to the die center line. The positioning means in the roll assembly is provided to limit the maximum distance between the cylinder and the bar means.

The interspacial relationship between the die means and the orifices therein, the bar means and the cylinder is such that, when polymer strands leave orifices in the die means, and pass over the cylinder into the cooling fluid, and under the bar means, each strand normally slidably engages a different circumferential surface portion of the cylinder whereby the cylinder tends to be revolvably driven thereby.

The present invention also is directed to a process for controlling strand drop off at an extrusion die in a plastic stranding operation. The process of the invention involves the step of continuously passing a plurality of hot polymer strands downwardly from a gaseous atmosphere into a fluid cooling bath in generally parallel configuration. The angle of individual strand passage or travel generally ranges from about 0° to 90° with respect to the horizontal. In the course of such passage, the strands traverse a zone where they are maintained in normally constant, slidable engagement with circumferential surface portions of a cylindrical member which is revolving in response to the movement of the strands thereover. As they pass over the cylindrical member, each strand is generally parallel with other strands, and strands are generally uniformly spaced from one another in a generally transverse direction (with respect to strand travel) as they pass over the cylindrical member. Prior to their immersion in the cooling bath, the strands are maintained at temperatures sufficient to keep them in a thermoplastic (e.g., tacky, molten) condition.

Thus, in accordance with the process of the invention, when a single strand ruptures, it almost immediately contacts an adjacent strand and becomes fused thereto without interrupting the flow of strands from the die into the cooling bath.

DRAWINGS

FIG. 2 is a vertical, longitudinal sectional view of the embodiment shown in FIG. 1;

FIG. 3 is a vertical transverse sectional view taken along 3—3 of FIG. 2;

FIG. 4 is an exploded view of a portion of the end region of the deflecting assembly; some parts thereof broken away and shown in section;

FIG. 5 is a vertical sectional view similar to FIG. 2 showing one modification of a cylinder assembly; and FIG. 6 is a view similar to FIG. 3, but taken along the line 6—6 of FIG. 5.

DESCRIPTION OF EMBODIMENT

Figure 1:
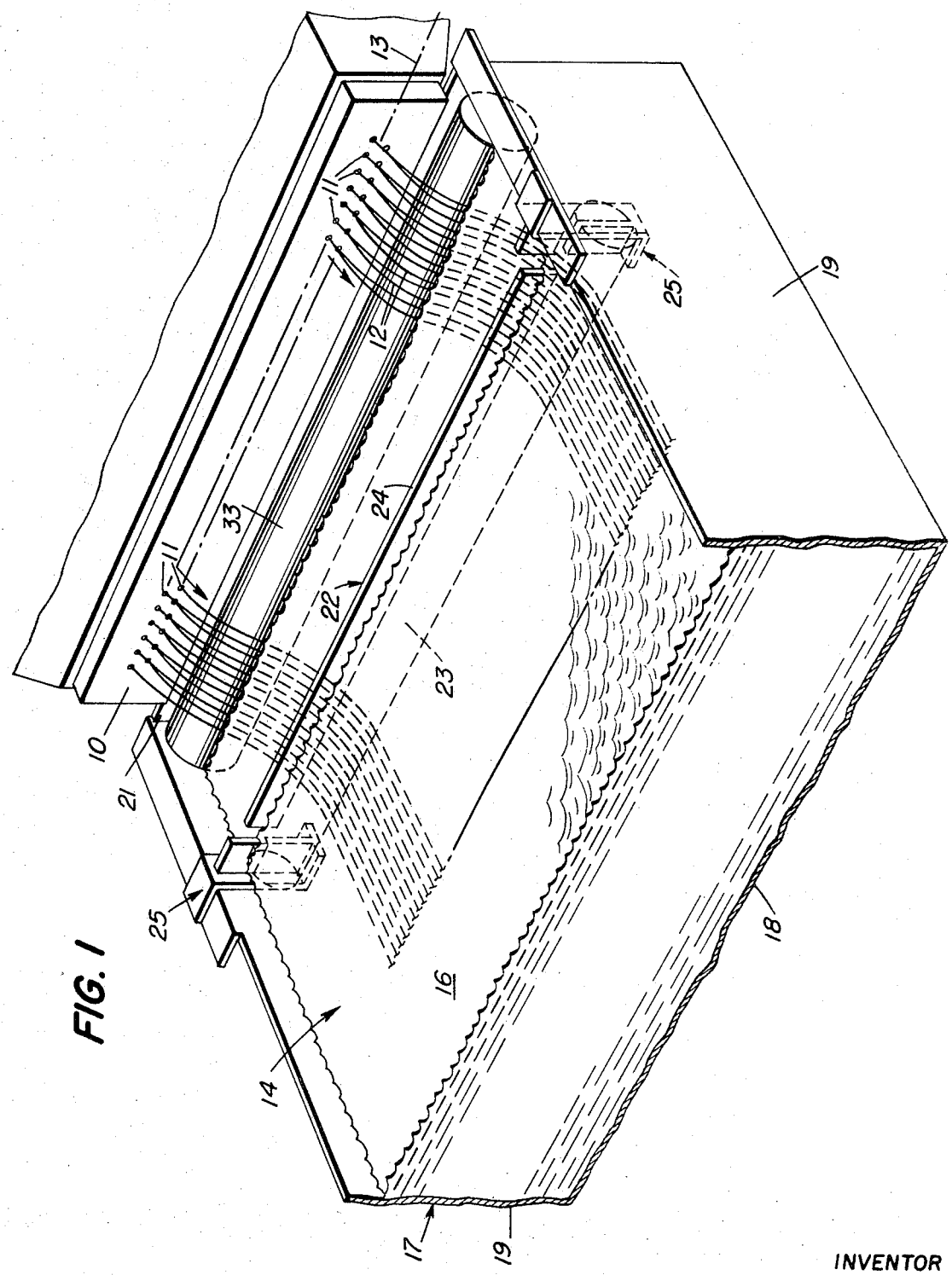
FIG. 1 is a perspective view of one embodiment of a system of the present invention, some parts thereof broken away.

Turning to the drawings, there is seen in the figures a typical elongated extrusion die 10 such as is employed in plastic stranding operations. This die is equipped with a plurality of orifices 11 adapted for the extrusion of hot polymer strands 12. The orifices 11 are generally regularly spaced from one another in die 10, and, in addition, the orifices 11 are regularly positioned in an elongated pattern whose center line 13 is approximately horizontal.

A fluid cooling bath designated in its entirety by the numeral 14 is used to cool strands 12. Bath 14 comprises cooling fluid 16 and a fluid holding means 17. The cooling fluid 16 is usually water, though other fluids can certainly be used. The fluid holding means 17 as shown, for example, in FIG. 1 comprises a bottom portion 18 with side walls 19 and end walls 21 are in fluid tight relationship to one another. The die 10 is positioned so that its center line 13 is generally above the surface of the cooling fluid 16. Die 10 extends transversely across the fluid cooling bath 14 and the center line 13 is generally parallel with the surface of the cooling fluid 16.

A deflecting assembly designated in its entirety by the numeral 22 is used to deflect strands 12 from die 10 down into cooling fluid 16. The deflecting assembly 22 includes bar 23 and baffle 24. Bar 23 extends horizontally but transversely across the fluid cooling bath 14. Bar 23 extends generally parallel to the center line 13 or die 10. In the embodiment shown, bar 23 is conveniently formed of soft steel or the like. The bottom most portion or edge of bar 23 is immersed into the fluid cooling bath 14 so as to lie well below the surface of the cooling fluid 16. Baffle 24 is positioned along the top edge portion of bar 23. Baffle 24 is conveniently formed from a sheet of soft steel or the like and is conveniently secured to bar 23 by welding or the like. Observe that the upper edge of baffle 24 extends above the surface of the cooling fluid 16 and that the baffle 24 extends in a direction generally parallel to the center line 13 of the die 10. Formed in the opposed ends of bar 23 is a slot 32, the center of slot 32 being generally coplanar with the center of baffle 24.

The assembly of bar 23 and baffle 24 is conveniently positioned in the fluid cooling bath 14 by means of a pair of clip assemblies, each designated in its entirety by the numeral 25. Each clip is conveniently formed from a strip or bar 26 of steel or the like and has a lower inwardly extending flange 27 (inwardly extending with respect to the fluid cooling bath 14) and an outwardly extending flange 28. Flange 28 rests on the lip of a side wall 19. Normal to strip 26 and abutting against the side face of flange 27 is a leaf 29 of steel or the like. Leaf 29 is conveniently secured to strip 26 by welding or the like. When the deflecting assembly 22 is to be mounted in fluid cooling bath 14, slot 32 in bar 23 is slid over leaf 29 so that the bottom edge of bar 23 rests against flange 27. Any convenient structure for deflecting assembly 22 can be employed for the present invention as those skilled in the art will readily appreciate, but solid, non-rotating, stationary hold-down bars are much preferred.

A pick-up roll or cylinder 33 is positioned on and in the surface of cooling fluid 16. Roll 33 is conveniently formed of sheet aluminum, or the like, and is hollow. It is preferred to have roll 33 float freely in and on the surface of cooling fluid 16 in which condition the buoyancy provided by the air contained within a sealed roll 33 generally is sufficient for purposes of the present invention for most use situations. However, any convenient structure for roll 33 can be employed without departing from the spirit and scope of the present invention.

Roll 33 is equipped with roll positioning means adapted to limit maximum distance between roll 33 and bar 23. In the embodiment shown in FIGS. 1 through 3, this roll positioning means is provided by the adjacent end wall 21 of fluid holder 17, and cylinder 33 is allowed to float and rotate freely. In the embodiment shown in FIGS. 5 and 6, the roll positioning means is provided mounting on opposite ends of a pick-up roll or cylinder 33' a pair of axially positioned opposed stub shafts 39 and 41, and then journaling such shafts for rotational movements in a pair of restraining channels 42 and 43, one in each respective side walls 19 of fluid holder 17. Each such channel 42 and 43 is formed by a pair of bars 44 formed of steel or the like. Each bar 44 is secured by welding or the like to each side wall 19. Any convenient structure for a roll-positioning means can be employed without departing from the spirit and scope of the present invention.

The interspacial relationship between die 10 together with the orifices 11 therein, bar 23, and cylinder 33 is such that, when polymer strands 12 leave orifices 11 and pass under bar 23, each strand 12 normally slidably engages a different circumferential surface portion of cylinder 33 whereby cylinder 33 tends to be revolvably driven thereby. The angular velocity of the circumferential surface of cylinder 33 thus approaches the linear speed of the strands 12 passing thereover and against. Any sort of conventional framework means for maintaining such interrelationship may be used, as those skilled in the art will readily appreciate.

In operation, the system functions in the following manner:

At start up, conveniently the deflecting assembly 22 and cylinder 33 (or 33') are removed, and a hot melt behind die 10 is extruded through orifices 11. Frequently, a mass of plastic first forms near the die 10, followed by the individual strands as extrusion rate increases. An operator manually carries the starting extrudate along from the die 10 to a cutter assembly (not shown), allowing the strands 12 to dip into the cooling bath to quench and solidify same. As soon as the strands 12 are being fed to the cutter assembly in a normal manner (usually a cutter assembly in operation is actually pulling strands 12 into itself), the operator slips the deflecting assembly 22 into place on clip assemblies 26, and slides the cylinder 33 (or 33') in from one side of fluid holder 17 under the strands 12 until such cylinder is in its normal operation configuration, as described above.

Normal operating conditions vary enormously from one thermoplastic polymer to another and from one equipment arrangement to another, so no definitive conditions suitable for all polymers and all equipment configurations can be stated. However, it can be observed that typical or known temperatures for strands at a die range from about 350° to 550°F. at corresponding pressure of from about 300 to 3000 psi. Die orifices range commonly from about 0.1 to 0.2 inch (strands normally expand slightly in diameter after leaving the die orifices). Extruders commonly range from about 3½ inches to 8 inches, with the number of strand orifices in any given die commonly ranging from about 20 to 200. Material throughput rates can range, say, from about 1000 to 6000 pounds per hour. Typically, pellets range from about one-sixteenth to one-fourth inch in length, with about one-eighth inch being especially common. Length of a cooling bath can be from 6 to 20 feet using a fluid depth of 5 inches to 1 foot. Strand spacing transversely between strands going over a cylinder 33 (or 33') can be from about one sixty-fourth inch to one-eighth inch, but larger or smaller spacings can be employed depending upon circumstances. No particular special criticality appears to be associated with the practice of the apparatus or method of this invention, and such values as are described herein are illustrative only, non-limitative, and given only to help teach this invention, as those skilled in the art will readily appreciate. The principles and practice of pelletization generally are well known to the art.

Should a strand 15 break after emergence from an orifice 11 and before entering cooling fluid 16, strand 15 typically is immediately brought into contact with an adjacent unbroken strand 12 and promptly welds itself thereto, owing to the fact that all strands are, prior to immersion in the cooling fluid 16, at elevated temperatures sufficient to maintain the strands in a generally molten and tacky condition; that is, the strands are sufficiently soft to fuse together immediately upon contact between one another.

The roll 33 (or 33') maintains the hot moving strands in proximate association with each other. The strands do not stick or adhere to such cylinder or roll because the cylinder is wetted by cooling fluid, lubricated, and cooled as it revolves. Since the strands are continuously moving forward, broken strands which are bonded to adjacent unbroken strands moved forward continuously beneath the bar 23 and the extruding operation continues uninterruptedly.

Should a broken strand rise up away from the vicinity of a cylinder 33 (or 33'), it soon strikes, or comes into engagement with baffle 24, which deflects the strand, causing it shortly thereafter to come into contact with other hot strands and the desired fusing of such broken hot strand to adjacent unbroken hot strands is thereby automatically achieved.

The geometric interrelationships between, and the individual construction of, the various separate elements employed in this operation of this invention can vary. The face of die 10 may be vertical or inclined. Similarly, while cylinder 33 represents a preferred configuration, its diameter is influenced by such factors as die 10 geometry, bath 14 size, position of bar 23, etc. Usually, a cylinder is conveniently from about 0.5 to 0.8 submerged in the cooling bath, and common cylinder diameters range from about 2 to 6 inches, with a diameter of about 2.5 inches being particularly convenient. Strand contact with a cylinder or roll surface can extend a distance of, say, from about one-fourth to 4 inches, with distances of three-eighths to five-eighths inch being most common, though longer or shorter average distances may be employed, depending upon circumstances.

What is claimed is:

1. Apparatus for control of strand drop off at an extrusion die in a plastic stranding operation comprising in combination:
   A. elongated extrusion die means having defined therein a plurality of orifices adapted for the extrusion of hot polymer strands therethrough, said orifices being generally regularly spaced from one another and further being regularly positioned in an elongated pattern whose center line is approximately horizontal,
   B. a fluid cooling bath, including cooling fluid and fluid holding means,
   C. said die means having its said center line positioned generally above the surface of said cooling fluid, generally transversely across said fluid cooling bath, and generally parallel with the surface of said cooling fluid,
   D. a deflecting assembly positioned generally transversely across said fluid cooling bath and including generally integral bar means and baffle means, said bar means having bottom surface portions which are immersed in said fluid cooling bath and which extend generally parallel with the surface of said cooling fluid, said baffle means being positioned generally over said bar means and extending above the surface of said cooling fluid in a direction generally parallel to said center line,
   E. a cylinder assembly, including a cylinder and roll restraining means, said cylinder being adapted to axially revolve on the surface of said cooling fluid in said fluid cooling bath and whose axis extends horizontally in a direction generally parallel to said center line, said restraining means being adapted to limit maximum distance between said cylinder and said bar means,
   F. the interspacial relationship between said die means and the orifices therein, said deflecting assembly, said fluid cooling bath, and said cylinder assembly being such that, when polymer strands leave said die means, pass over said cylinder, and pass under said bar means in said cooling fluid, each of said strands normally slidably engages a different circumferential surface portion of said cylinder whereby said cylinder tends to be revolvably driven thereby.

2. The apparatus of claim 1 wherein said roll restraining means is defined by an end wall of said fluid holding means.

3. The apparatus of claim 1 wherein said restraining means comprises shaft means functionally associated with said cylinder and coaxial therewith at opposite end regions thereof, and journal means for said shaft means functionally interconnecting said cylinder and said fluid cooling means whereby said cylinder is revolvable.

4. The apparatus of claim 1 wherein said cylinder has a diameter of from about 2 to 6 inches.

* * * * *